(12) United States Patent
Fraivillig

(10) Patent No.: US 10,119,052 B2
(45) Date of Patent: *Nov. 6, 2018

(54) ROBUST INTERFACE BONDING WITH B-STAGED THERMOPLASTIC POLYIMIDE ADHESIVE

(71) Applicant: James B. Fraivillig, Boston, MA (US)

(72) Inventor: James B. Fraivillig, Boston, MA (US)

(73) Assignee: FRAIVILLIG TECHNOLOGIES COMPANY, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/395,140

(22) Filed: Dec. 30, 2016

(65) Prior Publication Data

US 2017/0145270 A1    May 25, 2017

Related U.S. Application Data

(62) Division of application No. 13/972,509, filed on Aug. 21, 2013, now Pat. No. 9,624,412.

(51) Int. Cl.

| | |
|---|---|
| *C08G 69/26* | (2006.01) |
| *C08L 51/00* | (2006.01) |
| *C08L 77/00* | (2006.01) |
| *C08G 73/10* | (2006.01) |
| *C08K 5/34* | (2006.01) |
| *C08K 5/20* | (2006.01) |
| *B05D 1/18* | (2006.01) |
| *C09J 179/08* | (2006.01) |
| *B05D 1/26* | (2006.01) |
| *B05D 1/28* | (2006.01) |
| *B32B 27/28* | (2006.01) |
| *B05D 3/10* | (2006.01) |
| *B05D 3/14* | (2006.01) |
| *B32B 37/12* | (2006.01) |
| *C09J 5/06* | (2006.01) |
| *C09J 7/35* | (2018.01) |

(52) U.S. Cl.
CPC .............. *C09J 179/08* (2013.01); *B05D 1/26* (2013.01); *B05D 1/28* (2013.01); *B05D 1/283* (2013.01); *B05D 3/108* (2013.01); *B05D 3/144* (2013.01); *B32B 27/281* (2013.01); *B32B 37/1207* (2013.01); *C09J 5/06* (2013.01); *C09J 7/35* (2018.01); *C09J 2201/61* (2013.01); *C09J 2203/326* (2013.01); *C09J 2477/00* (2013.01); *C09J 2479/08* (2013.01)

(58) Field of Classification Search
None
See application file for complete search history.

(56) References Cited

U.S. PATENT DOCUMENTS

| | | | |
|---|---|---|---|
| 6,140,402 | A | 10/2000 | Dietz et al. |
| 2015/0343753 | A1 | 12/2015 | Krieg et al. |

FOREIGN PATENT DOCUMENTS

EP    0 048 315    * 10/1985

OTHER PUBLICATIONS

Exhibit A, web site, Adhesives and Sealants.com, "B-Staged Adhesive Films", May 5, 2005, paragraph 4.
Exhibit B, web site, Solid State Technology, "U/V B-Stage Technology Provides Process & Performance Advantages".

* cited by examiner

*Primary Examiner* — Robert T Butcher
(74) *Attorney, Agent, or Firm* — John M. Brandt

(57) ABSTRACT

Thermoplastic Polyimide (TPI) polymer adhesive coated laminating films in which the TPI coating is under cured or B-staged as well as the process for preparing the films and the use thereof is disclosed.

4 Claims, 2 Drawing Sheets

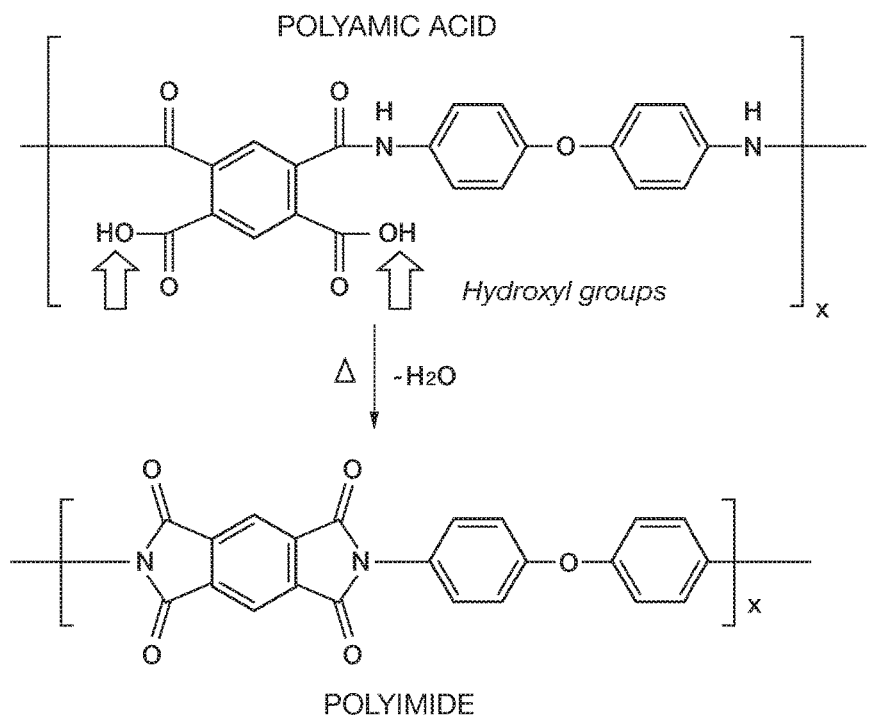

FIG. 1

| COMPARISON OF TRADITIONAL CURING AND B-STAGING OF TPI ADHESIVE POLYMER | | | | | |
|---|---|---|---|---|---|
| | Coating | | Laminating | | |
| TPI layer format | Polymer temp (min) | Residual solvent | Temperature | Pressure | Comments |
| Traditional cure | 200-400°C | <2% (or ~ nil) | 250-330°C | 150-600psi | No need for post-processing |
| B-staged | 80-180°C | 20-60% | 180-300°C* | 2-20 psi* | Polymer curing is advanced with subsequent heating. *Higher temperatures and pressures will generally produce better laminate properties |

FIG. 2

|  | PI % | Solvent % | Max Temp Exposure | Description |
|---|---|---|---|---|
|  | Solids only: PI/(PI+PAA) | % of total | Seen by polymer during the process |  |
| PAA solution | 0% | 70-90% | 50-70°C | Polymerization |
| B-staged coating | 0-50% | 20-60% | 80-180°C | Coating + drying on substrate |
| Post-lamination | 80-100% | 0-5% | 180-300°C | High-temp lamination with applied pressure |

ROBUST INTERFACE BONDING WITH B-STAGED THERMOPLASTIC POLYIMIDE ADHESIVE

CROSS REFERENCE TO RELATED APPLICATIONS

This application is based on the disclosure of Provisional Application Ser. No. 61/742,857 filed Aug. 21, 2012, by the same inventor, which is hereby incorporated by reference, and is a Divisional Application of Utility application Ser. No. 13/972,509 by the same inventor.

BACKGROUND OF THE INVENTION

1. Field of the Invention

The invention relates to thermoplastic adhesives and more particularly to thermoplastic-polyimide (TPI) adhesive lamination films and coatings.

2. Description of the Prior Art

Thermoset adhesives are the dominant bonding technology in most electronic applications, generally because they are relatively inexpensive and easy-to-use. They become very strong through polymer cross-linking, usually at elevated temperatures. The resultant bondline is generally quite brittle. Thermoset adhesives in electronics include epoxy, acrylic and silicone.

Thermoplastic adhesives are used in applications where a ductile bondline is required. Their polymer chains are very stable, and do not require cross-linking Therefore, the resultant bondline has ductility. It will not crack under stress and strain.

Polyimide polymer provides the ultimate in thermal, chemical and structural durability as opposed to lower temperature thermoplastic polymers such as, for example, polyethylene, polypropylene, polyester, and polyamide. Most polyimide polymers are made through a condensation reaction within the polymer chain, where a water molecule is eliminated during the closure of a carbon ring. Carbon rings within the aromatic polymer chain are the basis for polyimide polymer stability. The precursor polymer is polyamic acid.

Thermoplastic-polyimide (TPI) adhesive provides an exceptional bondline for demanding electronic packaging applications, since it is very durable even at minimal thicknesses. This is especially critical where two different layers with dissimilar Coefficients-of-Thermal-Expansion (CTE) are bonded together and undergo repeated thermal cycles. This is a leading cause of failure in many structures, electronic and otherwise. The ability of TPI adhesive to be ductile and strong make it ideal for thermal-interface bondlines where the need to withstand CTE induced stress as well as a minimal thickness to maximize thermal transfer between metal layers, such as between a heat generating device and a heat sink, is required.

TPI adhesive laminate films are known in the prior art and are commercially available from, for example, DuPont Corporation, Wilmington Del., under the trade names Pyralux® AP and Kapton® KJ and LJ films; these films are solvent-cast, as is this invention. In addition, TPI adhesive films can be extruded from SABIC's (Riyadh, Saudi Arabia) Ultem® and Extern® resins and DuPont's Aurum® resin. In all of those, as best known to the applicant, the TPI adhesive is in a fully cured state, i.e., the precursor polymer has been substantially converted to TPI and the process solvents have been evaporated. Use of these requires relatively high temperatures and pressures. In contrast, the under cured or B-staged films and coatings of the present invention can be employed and used in manufacturing operations at moderate conditions approaching those of conventional thermoset systems. This is accomplished by engineering the drying and curing level of the thermoplastic-polyimide adhesive layer of the film in a way that facilitates handling and use of the product. Partially curing the TPI adhesive allows lamination processing at much lower temperatures and pressures than a fully cured TPI adhesive layer.

Under curing, or B-staging, thermoplastic-polyimide adhesive allows bondline processing at much lower temperatures and pressures than conventional fully cured TPI coatings: the reduction in temperature can be as much as 80° C. or more; the reduction in pressure can be as much as 95-99%. The B-staging process for these solvent-cast TPI systems is much different than conventional thermoset adhesive systems such as the high-solids epoxy and silicones.

TPI polymers in their precursor polyamic-acid (PAA) liquid form are a relatively low-solids solution (<20%) in a strong solvent, such as NMP, DMAc or DMF. NMP or n-pyrol is generally preferred as it is less hazardous than other equivalent solvents, and when volatilized, evacuates bondlines quickly and smoothly, without blistering. The PAA liquid solution is applied as a thin layer to a substrate, by any of a variety of conventional coating methods. Heat is applied to the coating through a conventional coating oven with hot air, which evaporates off the solvent at a controlled rate and can start the conversion of the PAA to polyimide (PI). In this invention, only enough heat, hot air, is used to evaporate a controlled amount of solvent and only a minor conversion, if any, of PAA polymer to PI polymer occurs. Leaving residual solvent in the B-staged coating dramatically increases the flow of polymer when the coating is reheated during the lamination process. This is critical in adhesive bondlines where micro-irregular surfaces are being mated. Practically all non-mirror surfaces are very irregular on a micro-level. In addition, the PAA polymer has hydroxyl groups which facilitate adhesion of the polymer to adjacent surfaces. As shown in FIG. 1 below, the schematic shows the condensation reaction of PAA polymer, made from PMDA/ODA monomers, to generic "Kapton" PI polymer.

It is important to delineate the concept of traditional curing of PAA polymer coatings to PI, as our invention represents a significant departure. In prior art, PAA coatings are exposed to very high heat during the coating process, removing all the solvent and converting much or all of the PAA to PI. This process removes practically all of the polymer flow and reactivity characteristics, so such a TPI lamination would require extremely high temperatures and pressures. Traditional lamination generally requires a very high-temperature platen press or vacuum autoclave. A totally cured TPI adhesive would need to be melted to provide bonding to adjacent surfaces; this would generally occur at 320-350° C. In addition, the fully cured TPI would require immense pressure applied during melting to flow the extremely viscous polymer into the adjacent surface to ensure adhesion.

The representative process conditions for coating and laminating for a representative TPI adhesive polymer are shown in FIG. 2 below, for both a prior art state and the B-staged state of the invention. Other TPI polymers could have different absolute temperatures and pressures for processing, but the relative differences between traditional cure and B-staged states would be about the same as the example shown. Coating and employment of the film in laminating procedures are performed sequentially, with different processes and generally at different locations.

SUMMARY OF THE INVENTION

The invention may be summarized as a Thermoplastic Polyimide (TPI) polymer adhesive coated laminating film and coatings in which the TPI coating is under-cured or B-staged as well as the process for preparing and using the films and coatings.

The invention provides a number of features and advantages including:

Utilizing the B-stage of a thermoplastic-polyimide (TPI) adhesive coating allows bonding and lamination at much lower temperatures and pressures. In addition, the thermoplastic TPI adhesive lamination process is very fast—generally taking a few minutes, total—versus the thermoset lamination process, which can take an hour or more. The B-staged TPI coating flows easily and bonds quickly and robustly at moderate conditions, similar to what might be used for conventional thermoset adhesive coatings.

The under curing of the B-stage can involve both leaving solvent in the layer and a low conversion of the polyamic-acid polymer (PAA) to polyimide polymer (PI). Traditionally, TPI adhesive coatings have all solvent removed and have near full-conversion to PI before the lamination process.

The reduction in lamination temperature and pressure dramatically reduces the equipment required and imparts much less stress on the lamination, both in processing and in the final interlayers. In fact, robust TPI bondlines can be created between surfaces held together with binder clips and baking the assembly in a toaster oven.

During the B-staged TPI bonding process at moderate temperature, the residual organic solvent, preferably, N-methyl-2-pyrrolidone (NMP), or, alternatively, dimethyl-laxetamide (DMAC) escapes cleanly, without blistering. Microchannels form within the bondline to facilitate the solvent outgassing. These same bondline microchannels also facilitate the moisture outgassing from the polymer's condensation reaction, as the PAA converts to PI. The bondline microchannels tend to collapse after the required outgassing, and do not appreciably impact the bond strength or thermal impedance of the bondline. Bondline microchannels can be eliminated by applying high pressure for a short period of time after the outgassing process has been completed.

Residual solvent in the B-staged TPI layer can provide surface-cleaning, facilitating a robust bond, during the heating-up of the lamination process.

Overwrought fears of NMP exposure have contributed to the traditional processing of TPI, where the TPI polymer is brought to or near its fully-cured state, eliminating the opportunity to utilize the unique properties of a truly B-staged TPI coating. This scare campaign about NMP was orchestrated ironically by manufacturers of fluorocarbon cleaning solutions, which competed with the supposedly hazardous NMP solvent in electronic processes. Years later, these fluorocarbons were banned, due to conclusive evidence of damaging the atmosphere's ozone layer. According their MSDSs, NMP is actually safer than rubbing alcohol, unless the exposed is pregnant or a flathead minnow. NMP is a common active-ingredient in paint remover.

TPI bondlines utilize the hydroxyl groups of the PAA polymer to facilitate bonding, resulting in a robust permanent bond well before full curing.

After the initial bonding process, further curing of the TPI, converting PAA to PI, can be done through simple post-baking or even utilizing the high temperature exposure in downstream processes, such as reflow soldering, and even in use.

The B-staged TPI technology can utilize a wide range of substrates such as film, foil, fabric, and release liner.

The B-staged TPI technology can be applied in a wide range of thicknesses (dry, 0.1-2 mil or 2-50 micron), on one or both sides of a substrate. Even thicker coatings would be possible, by nip-laminating TPI sheet-adhesive to a TPI-coated substrate. Optimal coating thickness would be determined by the smoothness of the surfaces to be bonded, and whether encapsulation is required of certain features.

The B-stage TPI technology can provide robust bonding for a wide range of surfaces: metal, glass, ceramic, semiconductor, and plastic.

A TPI bondline can provide robust adhesion over a wide range of conditions, even when being extremely thin (down to 0.08-0.12 mil, or 2-3 um). This is critical in reducing both cost as TPI polymers can be relatively costly, especially compared to conventional thermoset adhesives and thermal impedance of the bondline.

A TPI bondline is structurally and electrically durable from cryogenic to 300° C., under severe interlaminar shear stress, due to CTE mismatch, under vibration and shock, under extreme radiation-exposure, and in practically all chemical environments. TPI polymer is also naturally flame-retardant.

TPI polymer accepts high loading of inert fillers extremely well, as the collapsing layer of the PAA with drying and curing to PI ensures excellent mating of polymer and particles.

The curing of the TPI polymer at moderate temperatures can be assisted with the aid of catalysts.

B-staged TPI coatings can be dry to the touch at room temperature, even when they contain relatively high levels of residual solvent. This facilitates both packaging and handling.

B-staged TPI coatings have an indefinite shelf life at room temperature.

The B-staged TPI technology will also be effective for a robust cover layer for demanding electronic and electrical applications. Additionally, the B-staged TPI technology will be effective for a robust primary insulation for demanding wiring and magnet applications.

There are many potential applications that could use this B-staged TPI technology for robust interface-bonding and cover layer/primary insulation in electronics and elsewhere. These include other applications where generated heat must be dissipated (such as heat-sink/baseplate attachment, electronic controls, light-emitting diodes, thermoelectric coolers); where high-temperature-resistance is critical (bus bars, resistive-heaters, wind-turbine generators); where radiation-resistance and cryogenic-resistance is critical (superconducting and other high-field magnets: particle accelerators, fusion reactors, MRI); and where naturally flame-retardant, non-halogenated insulation is critical (aerospace, subway motors).

Under or partially cured TPI film and coating will have much more flow to fill in the micro-irregularities in the adjacent surface of the laminate, ensuring surface intimacy and have much greater reactivity for surface adhesion than a fully-cured TPI coating. This is why less temperature, pressure and dwell time are required for the lamination of a partially cured TPI coating. This is especially important when a TPI coating of only a few microns, for example, 3 microns or 0.00012", is used to laminate surfaces together. The standard thickness of a TPI coating in the industry is 2-5 micron. Polyimide adhesives are very rugged when properly laminated, even with the bonding of dissimilar materials, and therefore don't need much thickness between the layers.

In comparison, a conventional thermoset adhesive bondline may require 25-50 micron thickness or more for the same applications.

Traditional fully cured TPI coating needs a significant amount of pressure to ensure a good bond, generally at temperatures well above 300° C. and with dwell times in excess of 60 minutes, as the polymer is very resistance to deformation and moves very slowly into the adjacent surface. This slow/no movement of polymer can become a significant problem during lamination when the lamination equipment and fixturing does not have very consistent applied pressure.

The water vapor evolved during the curing of the TPI polymer during the lamination process at high temperature and low pressure needs to be evacuated from the bondline between the adjacent surfaces, or else severe blistering will occur, which destroys the lamination. Water vapor pressure at elevated temperatures will force the evolved water to escape a laminate bondline held under considerably lower pressure than the inherent water vapor during the heating process. For instance, a B-staged TPI bondline that reaches 250° C. during the lamination process will be evolving water that has a vapor pressure of about 500 psi and if the applied pressure on the lamination is, for example 5-50 psi, the water vapor can escape easily.

Under low applied-pressure during lamination, the water evolved from the condensation reaction, or conversion, of the polyamic-acid polymer to polyimide polymer escapes the lamination bondline in microchannels in the TPI coating interface. As the laminate is cooled, the microchannels collapse, allowing the TPI coating to form a robust bondline between the adjacent surfaces.

After complete outgassing of the TPI bondline at the maximum temperature, much higher pressure can be applied to the bondline (100-1000 psi) in the lamination process. This ensures that the bondline integrity, including complete conformance of the laminate materials, is locked-in. This high final pressure as described above effectively eliminates the bondline's ability to re-form microchannels for water vapor outgassing without blistering.

If the TPI laminate has not seen a high pressure lamination step, then the microchannels can re-form if or when the laminate sees a temperature above the highest it has already experienced, and the additional evolved water vapor can escape. For instance, a TPI laminate made at 230° C. under low pressure can survive a downstream soldering process at 260° C., as the evolved water vapor from the TPI's condensation reaction at the even-higher temperature can escape thru the microchannels without blistering.

These, and other features and advantages of the invention will become more evident from the description of the preferred embodiment accompanied by the drawings which follows.

DESCRIPTION OF THE DRAWINGS

FIG. 1 is a schematic drawing of the chemical process of the invention;

FIG. 2 is a table comparing the invention with the prior art;

DESCRIPTION OF THE PREFERRED EMBODIMENT

Figures 3, 4:
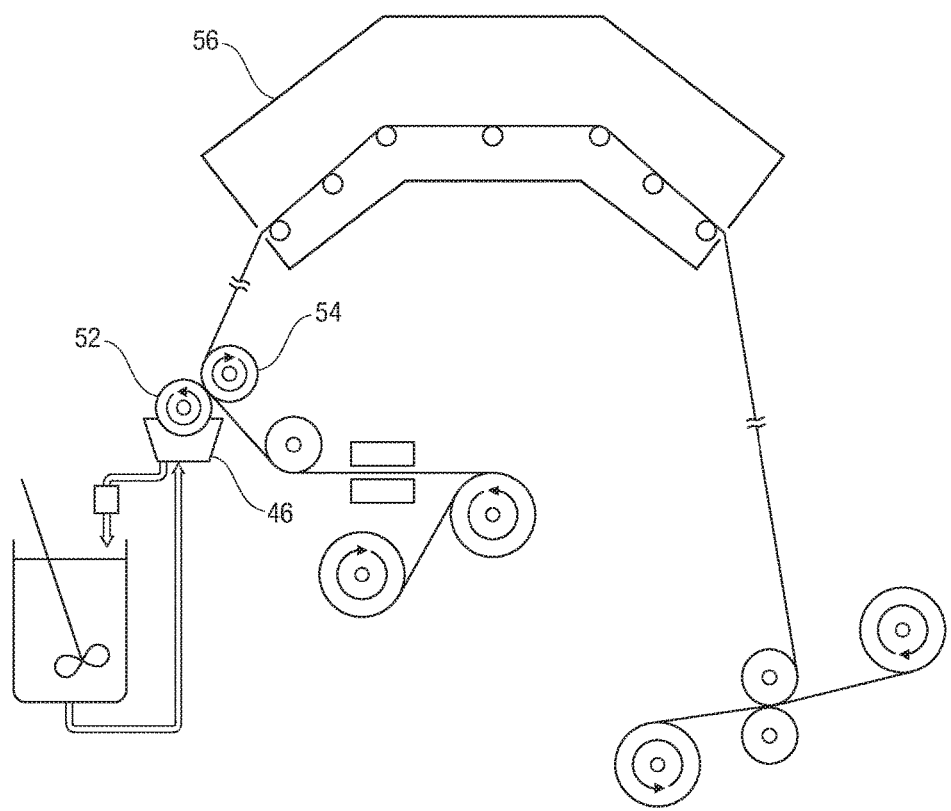
FIG. 3 is a table describing the invention in terms of the physical and chemical parameters of the succeeding stages of the TPI coating.
FIG. 4 is a schematic drawing of the apparatus suitable for carrying out the process of the invention.

The preferred embodiment of the invention is a Thermoplastic Polyimide (TPI) polymer adhesive coated laminating film in which the TPI coating is under cured or B-staged as described above. The coating may be placed on one side or both. The substrate may comprise any suitable polyimide material such as DuPont Kapton FPC or CR-ST films or Kaneka Apical AV film of a thickness in the 0.5-5 mil range. Other substrates and thicknesses that are suitable are copper foils in the 0.7-5 mil range and glass fabrics in the 2-10 mil range. Coating formulations that have proved successful are FM901 from Fraivillig Technologies Boston, Mass. and LARC-TPI from Imitech Corporation, Schenectady, N.Y.

FIG. 3 is a table which describes the invention through the physical and chemical parameters in the different steps of the processes of fabricating and using the invention, i.e., formulation of the polyamic-acid polymer in solution, coating and B-staged curing of the TPI polymer, and post-lamination use in suitable applications. These percentages are only of the TPI coating, and do not include any substrate material. As will be seen in FIGS. 2 and 3, the partial, under cure, or B-staged state of the resulting product is produced at a lower temperature than prior art or traditional cures and results in a much lower TPI content and much higher residual solvent content than the presently available fully cured TPI films.

An example of a process for preparing the films with reference to FIG. 4 is as follows: The adhesive is agitated at all times in holding tank 48 and circulated through a coating bath 46. To optimize the 'wetting' of the adhesive to the Kapton film, the film is corona-treated, both by the manufacturer (DuPont) and immediately before coating at a contact coater such as Lamart Corporation, Clifton, N.J.

A gravure roll coating head 52, which lays down a specific amount of wet adhesive based on its cell size, rotates through bath 46. The gravure cells pick up the adhesive in the coating bath and deposit the adhesive onto the film upon contact with back-up roll 54. The gravure roll lays down about 20 microns of wet polymer, consisting of about 15% polymer and 85% solvent, onto the film.

The coated film web is then transported through the oven 56, where the solvent is evaporated and the adhesive polymer is cured. The heating portion, utilizing impinged hot air, of the single zone coating oven is about 20 feet long and the line-speed is 45-50 feet/minute, resulting in a very short dwell time of 24-27 seconds. Upon emerging from the oven, the TPI coated film is now wound up on a roll, and will have an infinite shelf life, assuming standard storage conditions. The film is coated one side at a time. If a two-side coating is required, the film is merely sent through for a second pass.

During lamination processing, when the TPI bond film reaches a temperature in excess of that during the above coating and drying, the adhesive will activate outgassing the remaining solvent and begin converting to polyimide.

The polyamic-acid polymer is synthesized in a solution of a polar solvent (such as NMP or DMAC), and is applied to the film surface by, for example, the coating technique described above. The TPI precursor, polyamic-acid polymer, is synthesized by the reaction of diamine and dianhydride monomers, in approximately 50:50 molar concentrations. In these TPI syntheses, the diamine monomer is dissolved into the polar solvent, and then the dianhydride monomer is added slowly to build the TPI polymer chain.

Typical TPI diamine can be one or more of the following monomers: 3,5-diaminobenzoic acid (DABA), 3,3'-diaminobenzophenone (3,3'-DABP), 3,4'-diaminobenzophenone (3,4'-DABP), diester diamine (RDEDA), 1,3-Bis (4-aminophenoxy) benzene (TPER), 3,4'-Oxydianiline (3,4'-ODA), 4,4'-Oxydianiline (4,4'-ODA), 4,4'-Methylene dianiline (4,4'-MDA), an aliphatic diamine, or a silicon-diamine among others. Typical TPI dianhydride can be one or more of the following monomers: 3,3',4,4'-Biphenyltetracarboxylic dianhydride (BPDA), 3,3',4,4'-Benzophenone tetracarboxylic dianhydride (BTDA), 4,4'-Oxydiphthalic anhydride (ODPA), Pyromellitic dianhydride (PMDA), or 2,2'-Bis-(3,4-Dicarboxyphenyl) hexafluoropropane dianhydride (6FDA) among others. TPI-precursor solutions, polyamic-acid polymer in solution, are also available commercially, such as LARC-TPI or Fraivillig Technologies FM901 solutions.

The choice of monomers in the TPI polymer determines its thermal processing requirements and thermal resistance, which are related. Typically, the higher the thermal resistance of the polymer, the higher the required process temperatures to cure the polymer. Both the thermal processing requirements and the inherent thermal resistance of a TPI polymer are typically correlated to the material's glass-transition temperature (Tg). In most Commercial applications lower Tg TPI polymers are preferable, as 1) most electronic applications do not require thermal resistances exceeding 250° C. for a significant amount of time and 2) lower Tg material can be processed and cured at much lower temperature, which minimizes the amount of special processing, stress, and degradation applied to other materials in the construction. The same principles taught in this invention can also be applied to higher Tg TPI polymers. The biggest difference would be in the required processing temperatures.

As variations in the above-described preferred embodiment may be made within the general concept of the disclosure, the invention is accordingly defined by the following claims.

What is claimed is:

1. A method for bonding two surfaces utilizing a heat activated thermoplastic adhesive, said method comprising in combination:
   A. providing a substrate comprising a first of said surfaces; and
   B. coating said heat activated thermoplastic adhesive on said substrate, said adhesive comprising in combination:
      i. a solvent; and
      ii. a mixture of polyamic-acid polymer and thermoplastic polyimide polymer solids disposed in said solvent, said mixture containing no less than 10% and no greater than 50% thermoplastic polyimide of the total polymer mass and said mixture further containing an amount of solvent of between 20 and 60% of the total mass of the mixture,
   said adhesive forming an adhesive bondline between said surfaces;
   C. providing a second of said surfaces;
   D. positioning the adhesive side of said first surface in contact with said second surface to form an unbonded laminate;
   E. applying heat and pressure to said unbonded laminate to:
      i. outgas said solvent from said adhesive bondline;
      ii. substantially convert all of said polyamic-acid polymer to said thermoplastic polyimide polymer, said conversion generating a quantity of water vapor,
      iii. outgas said water vapor from said adhesive bondline; and
      iv. bond said surfaces at the completion of said outgassing.

2. The method of claim 1 further including the further step of applying additional higher pressure to said laminate to enhance said bond.

3. The method of claim 1 wherein said solvent is selected from the group consisting of N-methyl-2-pyrrolidone (NMP) and dimethylacetamide (DMAC).

4. The method of claim 1 wherein said polyamic-acid polymer comprises a mixture of diamine and dianhydride monomers, said diamine monomer is selected from the group consisting of
3,5-diaminobenzoic acid (DABA), 3,3'-diaminobenzophenone (3,3'-DABP), 3,4'-diaminobenzophenone (3,4'-DABP), 1,3-Bis (4-aminophenoxy) benzene (TPER), 3,4'-Oxydianiline (3,4'-ODA), 4,4'-Oxydianiline (4,4'-ODA), 4,4'-Methylene dianiline (4,4'-MDA), an aliphatic diamine, and a silicon-diamine; and said dianhydride monomer is selected from the group consisting of 3,3',4,4'-Biphenyltetracarboxylic dianhydride (BPDA), 3,3',4,4'-Benzophenone tetracarboxylic dianhydride (BTDA), 4,4'-Oxydiphthalic anhydride (ODPA), Pyromellitic dianhydride (PMDA), and 2,2'-Bis-(3,4-Dicarboxyphenyl) hexafluoropropane dianhydride (6FDA).

* * * * *